(12) United States Patent
Bradley

(10) Patent No.: US 11,417,207 B2
(45) Date of Patent: Aug. 16, 2022

(54) ROADWAY SAFETY SYSTEM

(71) Applicant: James P. Bradley, Dallas, TX (US)

(72) Inventor: James P. Bradley, Dallas, TX (US)

(*) Notice: Subject to any disclaimer, the term of this patent is extended or adjusted under 35 U.S.C. 154(b) by 0 days.

(21) Appl. No.: 17/695,393

(22) Filed: Mar. 15, 2022

(65) Prior Publication Data
US 2022/0208002 A1 Jun. 30, 2022

Related U.S. Application Data

(62) Division of application No. 17/521,792, filed on Nov. 8, 2021, now Pat. No. 11,295,613, which is a division
(Continued)

(51) Int. Cl.
| | |
|---|---|
| *G08G 1/056* | (2006.01) |
| *G08G 1/07* | (2006.01) |
| *E01F 13/04* | (2006.01) |
| *G08G 1/0967* | (2006.01) |
| *G08G 1/042* | (2006.01) |
| *G08G 1/16* | (2006.01) |
| *G08G 1/04* | (2006.01) |

(Continued)

(52) U.S. Cl.
CPC .......... *G08G 1/075* (2013.01); *E01F 13/048* (2013.01); *G06V 20/52* (2022.01); *G06V 20/54* (2022.01); *G08G 1/02* (2013.01); *G08G 1/04* (2013.01); *G08G 1/042* (2013.01); *G08G 1/056* (2013.01); *G08G 1/096725* (2013.01); *G08G 1/096883* (2013.01); *G08G 1/164* (2013.01); *G06V 20/625* (2022.01); *G06V 2201/08* (2022.01)

(58) Field of Classification Search
CPC ........ G08G 1/166; G08G 1/075; G08G 1/207; G08G 1/02; G08G 1/04; G08G 1/042; G08G 1/056; G08G 1/096725; G08G 1/164; G06V 20/625; E01F 13/04; E01F 13/044; E01F 13/08
See application file for complete search history.

(56) References Cited

U.S. PATENT DOCUMENTS

| | | | | |
|---|---|---|---|---|
| 3,824,469 | A | * | 7/1974 | Ristenbatt ............... G01S 13/74 340/8.1 |
| 4,133,140 | A | * | 1/1979 | Berard .................. G08G 1/075 49/49 |

(Continued)

*Primary Examiner* — Andrew W Bee
(74) *Attorney, Agent, or Firm* — Terrile, Cannatti & Chambers; Michael Rocco Cannatti

(57) ABSTRACT

A safety system to prevent a wrong-way vehicle from entering a roadway by driving onto an exit ramp in the wrong direction. A detection system monitors and detects the wrong-way vehicle as soon as it enters the exit ramp in the wrong direction. Upon detecting a wrong-way vehicle, the roadway safety system remotely sends a signal to turn off the motor of the wrong-way vehicle. The system may also record the vehicle's identification and communicate it to a command center to determine the mobile phone number of the owner/driver and call the driver to alert them that they are driving the wrong-way. Alternatively, a series of one or more penetrable and/or impenetrable barriers could be deployed to stop the wrong-way vehicle. The safety system may further include a communications system to communicate to a central office to initiate other alarms and control traffic on the roadway in response to detecting a wrong-way vehicle.

22 Claims, 5 Drawing Sheets

Related U.S. Application Data of application No. 17/062,850, filed on Oct. 5, 2020, now abandoned.

(51) Int. Cl.
*G08G 1/0968* (2006.01)
*G06V 20/52* (2022.01)
*G06V 20/54* (2022.01)
*G08G 1/02* (2006.01)
*G06V 20/62* (2022.01)

(56) References Cited

U.S. PATENT DOCUMENTS

| | | | | |
|---|---|---|---|---|
| 4,320,380 A * | 3/1982 | Berard | ............... | E01F 13/105 49/49 |
| 5,203,422 A * | 4/1993 | Estep | ............... | B60T 7/22 180/169 |
| 5,250,769 A * | 10/1993 | Moore | ............... | G08G 1/02 200/86 R |
| 8,917,188 B2 * | 12/2014 | Wietfeld | ............... | G08G 1/095 340/568.1 |
| 9,702,098 B1 * | 7/2017 | King | ............... | E01F 9/559 |
| 9,786,166 B2 * | 10/2017 | Jeschke | ............... | G08G 1/166 |
| 10,407,853 B1 * | 9/2019 | Dunn | ............... | E01F 13/105 |
| 10,836,309 B1 * | 11/2020 | Trundle | ............... | G08G 1/0116 |
| 11,295,613 B1 * | 4/2022 | Bradley | ............... | G08G 1/042 |
| 2005/0031411 A1 * | 2/2005 | Hensley | ............... | E01F 13/123 404/11 |
| 2007/0150183 A1 * | 6/2007 | Tolmei | ............... | G01C 21/26 701/488 |
| 2013/0063282 A1 * | 3/2013 | Baldwin | ............... | B61L 29/282 340/941 |
| 2013/0220033 A1 * | 8/2013 | Weston | ............... | G08G 1/02 73/862.625 |
| 2015/0146001 A1 * | 5/2015 | White | ............... | E01F 13/06 348/149 |
| 2016/0316363 A1 * | 10/2016 | Li | ............... | H04W 12/04 |
| 2017/0015243 A1 * | 1/2017 | Geisler | ............... | B60Q 9/008 |
| 2018/0018877 A1 * | 1/2018 | Townsend | ............... | G08G 1/096741 |
| 2018/0050693 A1 * | 2/2018 | Al-Deek | ............... | B60K 35/00 |
| 2019/0266893 A1 * | 8/2019 | Sambo | ............... | G08G 1/20 |
| 2019/0301116 A1 * | 10/2019 | Lee | ............... | G08G 1/042 |

* cited by examiner

ROADWAY SAFETY SYSTEM

CROSS-REFERENCE TO RELATED APPLICATIONS

This application is a division of co-pending application Ser. No. 17/521,792, filed Nov. 8, 2021, which is a division of application Ser. No. 17/062,850, filed Oct. 15, 2020, now abandoned, both of which are incorporated herein by reference in their entireties.

BACKGROUND OF THE INVENTION

Field of the Invention

The present disclosure generally relates to the field of vehicle traffic monitoring and safety systems. In one aspect, the present invention relates to a roadway safety system to reduce or prevent wrong-way collisions on a roadway, such as a tollway, freeway or highway.

Description of the Related Art

Wrong-way drivers present a danger to the public traveling on roadways. Wrong-way drivers cause collisions, often times head-on collisions, that result in serious injuries or death. Once a wrong-way driver is traveling in the wrong direction on a roadway, the closing speed between the two vehicles approaching at high speeds, perhaps 70 mph, from opposite directions makes it difficult or impossible for the driver of the vehicle proceeding in the right direction on the roadway to take evasive action to avoid a collision. In addition, roadways are often constructed with a median barrier and little or no shoulder room on the roadway, which further limits the ability of a driver of the vehicle traveling in the correct direction to take evasive action to avoid a collision.

Studies have shown that wrong-way collisions are often caused by drivers whose judgment is impaired because they are under the influence of alcohol or drugs. These studies have also shown that elderly drivers may become confused and drive the wrong-way onto an exit ramp which allows them to enter the roadway in the wrong direction. "Wrong-way" signs have been used for years to try to alert drivers that they are traveling in the wrong direction on a roadway. In addition, various systems have been deployed to activate visual or audio alarms upon detecting the presence of a wrong-way vehicle traveling the wrong direction on a roadway or the exit ramp. However, a wrong-way driver who is under the influence of alcohol or drugs or who is confused is not likely to heed a warning sign or see or hear and respond to alarms. Importantly, wrong-way drivers need to be stopped on the exit ramp before they enter the roadway in the wrong direction.

As seen from the foregoing, the existing vehicle traffic monitoring and safety systems are ineffective due in large part to the challenges of using visual or audible warnings to prevent high speed collisions by impaired or distracted drivers.

BRIEF DESCRIPTION OF THE DRAWINGS

The present invention may be understood, and its numerous objects, features and advantages obtained, when the following detailed description of a preferred embodiment is considered in conjunction with the following drawings.

Figure 1:
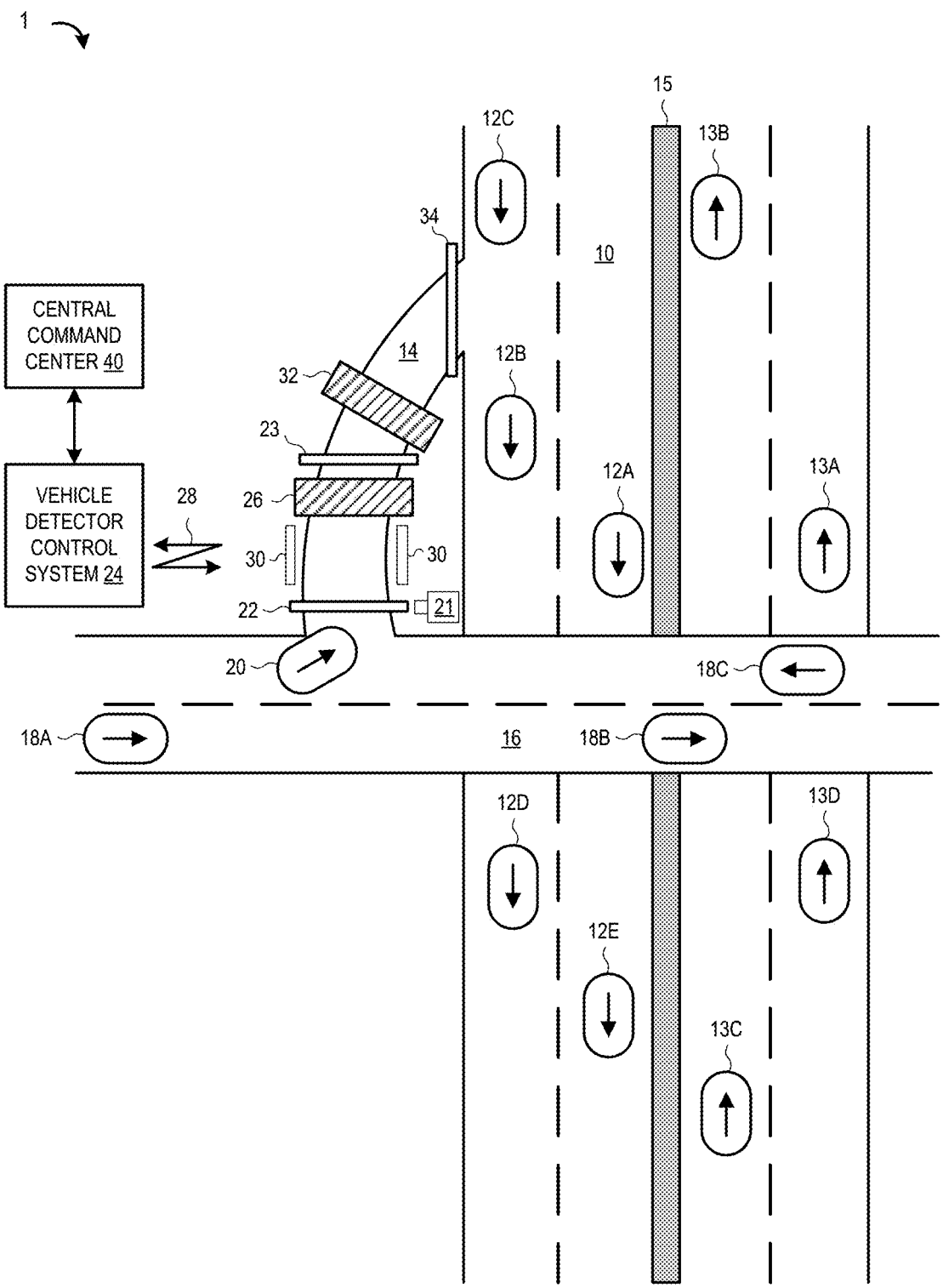
FIG. 1 shows a schematic view of a junction of two roadways connected by an exit ramp in accordance with selected embodiments of the present disclosure.

It will be appreciated that for simplicity and clarity of illustration, elements illustrated in the drawings have not necessarily been drawn to scale. For example, the dimensions of some of the elements are exaggerated relative to other elements for purposes of promoting and improving clarity and understanding.

DETAILED DESCRIPTION

A roadway safety system to reduce or eliminate collisions caused by wrong-way drivers on a roadway has a computer controlled system for monitoring and promptly detecting a vehicle that is about to violate the rules of the road by entering an exit ramp in the wrong direction from a street or another roadway. The sensors for the system may include magnetic sensors, electronic sensors, photoelectric sensors, cameras and physical sensors. These sensors may be in, nearby or over the exit ramp. The physical sensors could be the order in which mechanical pedals or bars are depressed by a vehicle's tires passing over them. The detection of the direction of a vehicle traveling on the roadway may also be accomplished by two sensors in, by or over the exit ramp that detect the direction of a vehicle from the order in which the sensors are activated, such breaking the beams of a pair of electronic eyes.

Alarms may be activated on the exit ramp to warn the wrong-way driver of his/her error, as well as alarms to alert a vehicle traveling in the right direction on the roadway that there is a wrong-way driver on the exit ramp. The system may also signal a central office or highway command center of the presence of a driver going the wrong-way on an exit ramp. The command center may activate alarms along the roadway to warn drivers of the presence of a wrong-way vehicle on the roadway, as well as deploying barriers to stop vehicles from entering onto the roadway.

The safety system may send a remote electronic signal to a motor controller located in the wrong-way vehicle that would stop the vehicle by turning off the motor of the wrong-way vehicle. The motor control on the wrong-way vehicle could be installed by the car's manufacturer or retrofitted on a used car, such as might be required by a government entity for someone who has previously been cited for driving under the influence.

The system may also include a video surveillance system that takes a picture of the wrong-way vehicle and its front and/or rear license plate(s). The picture of the vehicle and its license plate is sent to the central command center to identify the wrong-way vehicle. In addition, the command center could identify the cell phone number of the wrong-way driver from the license plate information and then call the wrong-way driver to warn him/her to stop. Alternatively, the information of the mobile phone number of the wrong-way driver could be obtained from reading a toll tag that is on the car or other identification obtained from vehicle registration decals in the front windshield. The system sends such information to a command center computer so that the vehicle's owner/driver is identified along with a mobile phone number. The command center computer or an operator calls the mobile phone number of the owner/driver to warn them that they are driving in the wrong direction.

The vehicle safety system may further include a barrier(s) to stop the wrong-way vehicle from traveling on the exit ramp in the wrong direction. A first impenetrable barrier may be quickly deployed to physically block or stop the vehicle from being able to continue its travel in the wrong direction. Alternatively, the first barrier may be a penetrable barrier that the wrong-way vehicle would break or penetrate if it did not stop. Such a penetrable first barrier could be flexible rubber or breakable plastic cones or rods that could be deployed across the width of the exit ramp ahead of the vehicle traveling in the wrong direction. In either case, a second impenetrable barrier located beyond the first barrier and further ahead of the direction in which the wrong-way vehicle is traveling could be deployed to block and stop the vehicle from traveling further and entering the roadway in the wrong direction. The second barrier may not be needed in safety systems that deploy an impenetrable first barrier. The second barrier could be deployed if the system detects that the wrong-way vehicle has not been stopped by the first barrier. In addition, it may be desirable to have another, third, barrier that is deployed at the entrance of the exit ramp from the roadway in order to save cars about to go on to the exit ramp from colliding with either of the first or second barriers or the wrong-way vehicle on the exit ramp.

The safety system would also provide for resetting the system by retracting the barriers and turning off the alarms after the threat of the wrong-way vehicle has been removed.

Various illustrative embodiments of the present invention will now be described in detail with reference to the accompanying figures which illustrate different views of an autonomous road safety system. While various details are set forth in the following description, it will be appreciated that the present invention may be practiced without these specific details, and that numerous implementation-specific decisions may be made to the invention described herein to achieve the device designer's specific goals, such as compliance with mechanical, electrical and/or design-related constraints, which will vary from one implementation to another. While such a development effort might be complex and time-consuming, it would nevertheless be a routine undertaking for those of ordinary skill in the art having the benefit of this disclosure. For example, selected aspects are depicted with reference to simplified plan and perspective views of a road safety system without including every device feature or geometry in order to avoid limiting or obscuring the present invention. Such descriptions and representations are used by those skilled in the art to describe and convey the substance of their work to others skilled in the art.

To provide additional details for an improved understanding of selected embodiments of the present disclosure, reference is now made to FIG. 1, which depicts an overhead view 1 of a portion of a roadway 10 showing vehicles 12A, 12B, 12C, 12D, and 12E traveling in the right direction on the right-hand side of a divided roadway 10. Vehicles 13A, 13B, 13C, and 13D are shown traveling in the right direction on the other side of a median 15. An exit ramp 14 is shown where vehicles traveling on the roadway 10 may exit to reach a street or roadway 16, which passes over the roadway 10. Street 16 has vehicles 18A and 18B traveling in the correct direction along the right side of street 16, and vehicle 18C is shown traveling in the correct direction on the opposite side of street 16.

The vehicle detection system continuously monitors the exit ramps of the roadway to promptly detect a wrong-way vehicle on the exit ramp. In FIG. 1, vehicle 20 is shown making an incorrect turn from street 16 to enter exit ramp 14 from the wrong direction. A first detector 22 detects the presence and direction of the wrong-way vehicle 20, as it begins to enter exit ramp 14 from the wrong direction. The detector 22 may utilize sensors, such as magnetic coils in or below the surface of the exit ramp, a camera system to detect the presence of a wrong-way vehicle, electronic sensors in the form of photoelectric cells or imaging sensors, an electric eye system that projects one or more beams of light across the width of the ramp or a pair of mechanical bars or pedals which may be depressed by a vehicle's tires. The Federal Highway Administration has published an article describing some of these sensors, entitled "A New Look at Sensors," Issue No: Vol. 71, No.3; Date: Nov/Dec 2007.

The sensors of detector 22 may be in-roadway sensors, by the roadway sensors or over-roadway sensors. A commonly used in-roadway sensor is the inductive loop detector, which consists of loops of wire embedded into saw cuts in the road pavement. Other in-roadway sensors include magnetic detectors and wireless magnetometer vehicle detection systems. The Texas Department of Transportation ("TDOT") describes a wireless magnetometer vehicle detection system in a bid specification publication. TDOT, Traffic Operations Division, TO-8010, rev. 5-2015. Over-roadway sensors include video image processors, microwave radar, laser radar, ultrasonic and passive infrared sensors installed alongside or above the exit ramp. Acoustic sensors could also be used alongside the roadway. The sensors, such as photoelectric cells, may be installed in pairs to produce information for determining the direction and speed of the vehicle. The University of Texas, Austin, Center for Transportation Research has published an article describing the use of such photoelectric sensors, entitled "Photoelectric Sensors for Counting and Classifying Vehicles, J. E. Garner and L. Huang, Transportation Research Record 1311.

As shown in FIG. 1, a video surveillance system 21 may include a camera(s) located to take a picture or image of the wrong-way vehicle 20 as well as detecting and reading vehicle identification such as provided by a toll tag or other RFID technology devices on the vehicle. The cameras could also capture a picture of the front and/or rear license plate of vehicle 20. The information could also include the vehicle registration sticker on the front windshield of the vehicle. In addition, the video surveillance system 21 could also collect information from a tollway identification tag, whether the roadway to be protected is a tollway or freeway. The information captured by the vehicle surveillance system 21, visual or digital data from a RFID device would be transmitted immediately to a central command office for the highway or tollway. The central command post could execute a computerized search for records of a mobile phone number for the owner of the wrong-way vehicle and call that mobile phone to warn the driver that he/she is driving in the wrong direction.

Figure 2:
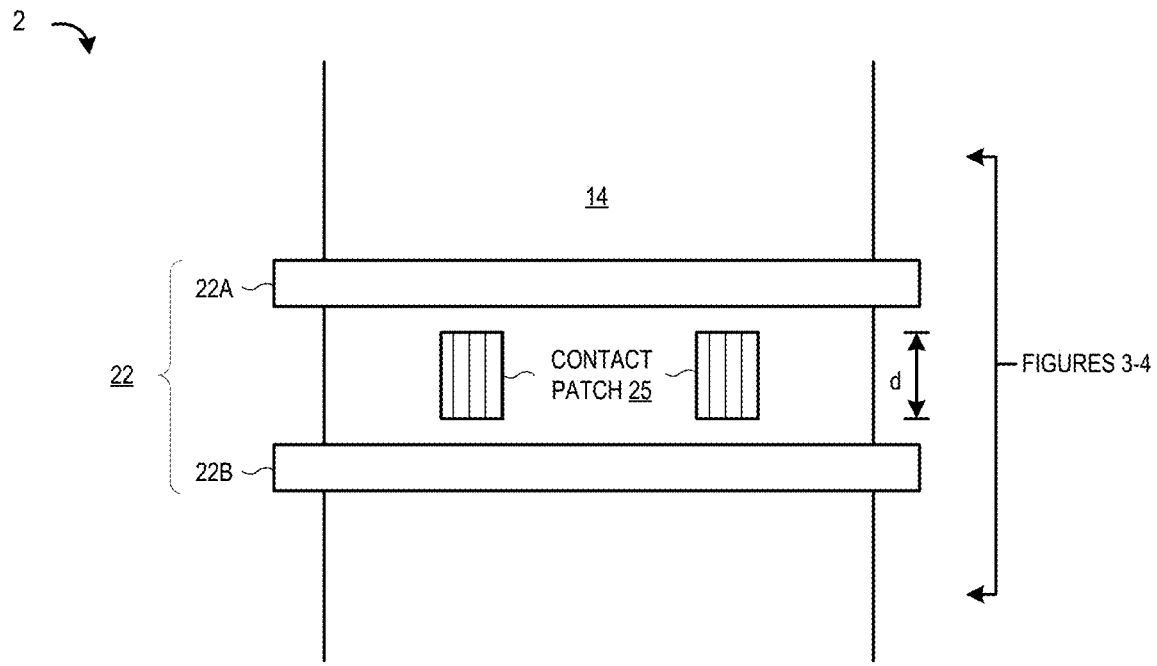
FIG. 2 shows a plan view of a vehicle detector system having sensors to detect the presence and direction of a vehicle in accordance with selected embodiments of the present disclosure.

To provide additional details for an improved understanding of selected embodiments of the present disclosure, reference is now made to FIG. 2, which shows a plan view 2 of a vehicle detector system 22 having sensors to detect the presence and direction of a vehicle. As depicted, the vehicle detector system 22 may include two mechanical pedals or bars 22A and 22B that are spaced apart a distance greater than the length "d" of a tire in contact 25 with the road, which distance "d" is sometimes called the "contact patch," which is on the order of a few inches, such as 2-5 inches. The distance d of the contact patch 25 could vary based upon the size of the tires. Tires for a large truck may have a larger contact patch than a tire for a smaller vehicle. The bars 22A and 22B should typically be spaced apart a distance greater that the widest contact patch for vehicle's tires.

Figure 3:
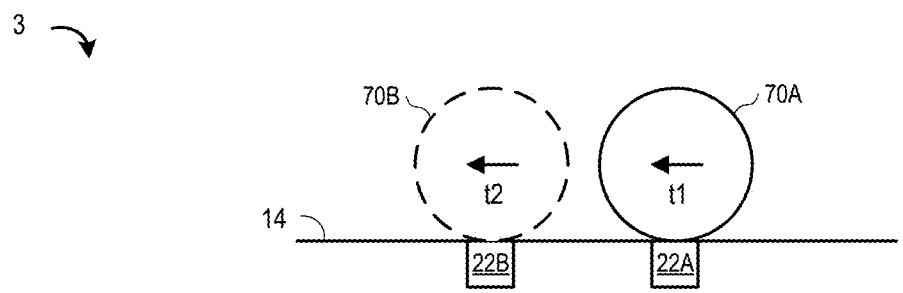
FIG. 3 shows a side view of a vehicle detector system having sensors to detect the presence and direction of a vehicle moving in the correct direction in accordance with selected embodiments of the present disclosure.

To provide additional details for an improved understanding of selected embodiments of the present disclosure, reference is now made to FIG. 3 which is a side view 3 of a vehicle detector system 22 shown in FIG. 2 where the sensors 22A, 22B are positioned in the road 14 to detect the presence and direction of a vehicle moving in the correct direction. As depicted at time t1, the front tire 70A of a vehicle traveling in the correct direction and leaving the exit ramp 14 to traverse on the street 16 would depress sensor pedal 22A first and then at a later time t2, the front tire 70B would depress sensor pedal 22B. The depression of the sensors 22A and 22B would be connected to a circuit to cause a switch to cause a signal to be sent to the vehicle detector computer that the vehicle on the ramp was traveling in the correct direction, as the pedals are depressed in the correct order of 22A then 22B.

Figure 4:
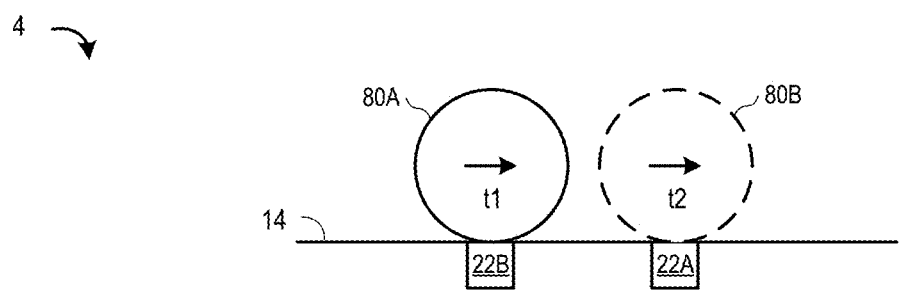
FIG. 4 shows a side view of a vehicle detector system having sensors to detect the presence and direction of a vehicle moving in the wrong direction in accordance with selected embodiments of the present disclosure.

To provide additional details for an improved understanding of selected embodiments of the present disclosure, reference is now made to FIG. 4 which is a side view 4 of a vehicle detector system 22 shown in FIG. 2, where the sensors 22A, 22B are positioned in the road 14 to detect the presence and direction of a vehicle moving in the wrong direction. As depicted at time t1, the front tire 80A of a wrong-way vehicle, such as vehicle 20 shown in FIG. 1, would first depress sensor pedal 22B, and then at a later time t2, the front tire 80B would depress sensor pedal 22A. The order of depressing the sensor pedals, 22B first and then 22A, would be a pattern indicating the vehicle 20 was traveling in the wrong direction. The sensor pedals 22A and 22B would have contact sensors and circuitry connected to a computer vehicle detector control system 24, such as by using a wireless or wired connection 28, to signal that a vehicle was entering the exit ramp in the wrong direction.

As shown in FIG. 1, the control system 24 controls the activation of alarms 30, sends a signal to a motor controller on the wrong-way vehicle 20 to shut off the engine, and/or also controls the deployment of one or more barriers, such as a first barrier 26, a second barrier 32, and/or a third barrier 34. The control system 24 also captures the vehicle identification information from a camera or RFID readers.

When vehicle detector 22 detects the wrong-way vehicle 20, it could be stopped by an electronic signal that is sent remotely to a motor shut-off controller located within the vehicle 20. The electronic signal could be sent in response to the detector 22 sensing a vehicle entering the exit ramp in the wrong direction. As an example, 3Built, LLC offers a Remote Engine Shut-off (RES) System which may be installed on cars or trucks. The 3Built RES is individually coded so it will not affect another RES on another vehicle. The RES system of the present invention may generate a code that permits only states, tollway entities or other government regulated roadways to generate such a signal that shuts the engine or motor to be shut-off. This feature of the roadway safety system would require car owners to equip their vehicles with such RES systems, which could apply to the general public or to drivers who have had a prior ticket for driving under the influence of alcohol or drugs and were required to have such a remote engine shut-off device on their vehicle.

Also, a vehicle detector 22 connected wirelessly or through a wired connection to a computerized vehicle detector control system 24 could be used to deploy one or more barriers in the path of the wrong-way vehicle. The detector control system 24 is a computer control system that continuously monitors signals from the detector 22 to determine if it is detecting and signaling that a vehicle, such as vehicle 20, is entering the wrong-way where the exit ramp 14 allows vehicles to exit in the right direction onto a roadway 16. In response to receiving a signal that a vehicle has entered on to the exit ramp 14 in the wrong direction, the control system 24 sends a signal to deploy a first barrier 26 ahead of the vehicle 20. The barrier 26 may be a penetrable or impenetrable barrier. An impenetrable barrier would prevent the vehicle 20 from moving further along the exit ramp 14. An impenetrable barrier 26 could be a barrier made of metal or concrete that pops up from the surface of the exit ramp 14. Alternatively, a penetrable or impenetrable barrier 26 could be an arm that is projected rapidly across the width of the exit ramp 14 or swings down rapidly across the width of the ramp 14 in front of the vehicle 20. A penetrable barrier 26 could also be a rubber shield or flexible rubber pylons that pop up from the surface of the ramp 14. Alternatively, the penetrable barrier 26 could be any material, such as wood or plastic, that drops across the ramp 14 in front of the direction in which the vehicle 20 is moving. If the vehicle did not stop in front of the barrier 26, it would penetrate and/or break the barrier, which may alert the driver to apply the brakes to stop the vehicle. In addition, the penetrable barrier could be a row of spikes or nails to puncture and deflate the tires of the wrong-way vehicle.

The detector control system 24 could also signal to turn on or activate visual and/or audible alarms 30 to alert the driver of the vehicle 20 that they are going in the wrong direction and need to stop. As depicted, the alarms 30 may be positioned as audio and/or visual alarms adjacent to one or more sides of the exit ramp where the wrong-way vehicle is driving, or may also be positioned over the exit ramp facing the direction of the wrong-way vehicle. As will be appreciated, the audio and/or visual alarms could also be positioned near the entrance area for the exit ramp, such as on the side of the barrier 34 facing the roadway 14, to also serve to alarm and warn any vehicle that was about to exit roadway 10 or was on the exit ramp 14 that a vehicle was headed toward them going in the wrong direction.

In addition, a second barrier 32 could be located between the first barrier 26 and the entrance of the exit ramp 14 from roadway 10 to act to block the further travel of the vehicle 20; if it did not stop at the first barrier 26, or if it drove through a penetrable barrier 26. In safety systems that do not deploy the second impenetrable barrier 32 at the same time that the first penetrable barrier is deployed, a second detector 23 could be used. The second detector 23 is located past the first barrier 26 and could detect if the vehicle 20 had not stopped and was still moving in the wrong direction on the ramp 14. Thus, the detector control system 24 could deploy the additional barrier 32 upon the initial receipt of a signal from detector 22 that a vehicle 20 had entered the exit ramp 14 in the wrong direction, or it could be deployed in response to a second detector 23 detecting that vehicle 20 was still moving in the wrong direction and violating the rules of the road. The barrier 32 would be an impenetrable barrier to act as the last safety feature that would stop a vehicle 20 on the exit ramp 14 before it could enter the roadway 10 and cause a serious accident and injuries or death to the persons in the colliding vehicles.

The detector control system 24 could also signal and deploy a third barrier 34 at or near the entrance of the exit ramp 14 from the roadway 10. The deployed barrier 34 could prevent vehicles on roadway 10 from entering onto the exit ramp 14 when a vehicle 20 had entered from the wrong direction.

The detection control system 24 could also be connected to a central office or command center 40 for the toll way or freeway to alert it that a vehicle 20 was attempting to violate the rules of the road and enter an exit ramp 14 in the wrong direction. In response, the central office or command center 40 could, as part of the safety control system, provide alerts all along the roadway 10 to all vehicles that would be put in danger by the presence of this wrong-way vehicle 20. The central office or command center 40 could also provide signals to activate alarms 42 on entrance ramps to the roadway 10 that would be ahead of and in the direction in which the wrong-way vehicle 20 would be traveling, if for some reason it was not stopped on the exit ramp 14. In addition, the central office or command center 40 could also deploy barriers, penetrable or impenetrable, to stop vehicles from entering the roadway at locations that would be ahead of where a wrong-way vehicle would be traveling, if for some reason vehicle 20 did get onto the roadway 10.

The detection control system 24 could also be linked to the roadway command center to transmit to it information detected from the wrong-way vehicle 20, such as the image of the vehicle, the license plate, the vehicle registration information and information read from a tollway tag. This information could provide the command center the ability to do a computer search to identify the mobile phone number of the owner, who may be driving the vehicle. The command center could then initiate a call to this mobile phone to attempt to warn the driver that the vehicle is headed in the wrong direction.

The detection control system 24 could be in two-way communication with the central command center for the roadway. The central command center could control the detection control system, including enabling it to cause the barriers to be retracted and the alarms turned off.

Figure 5:
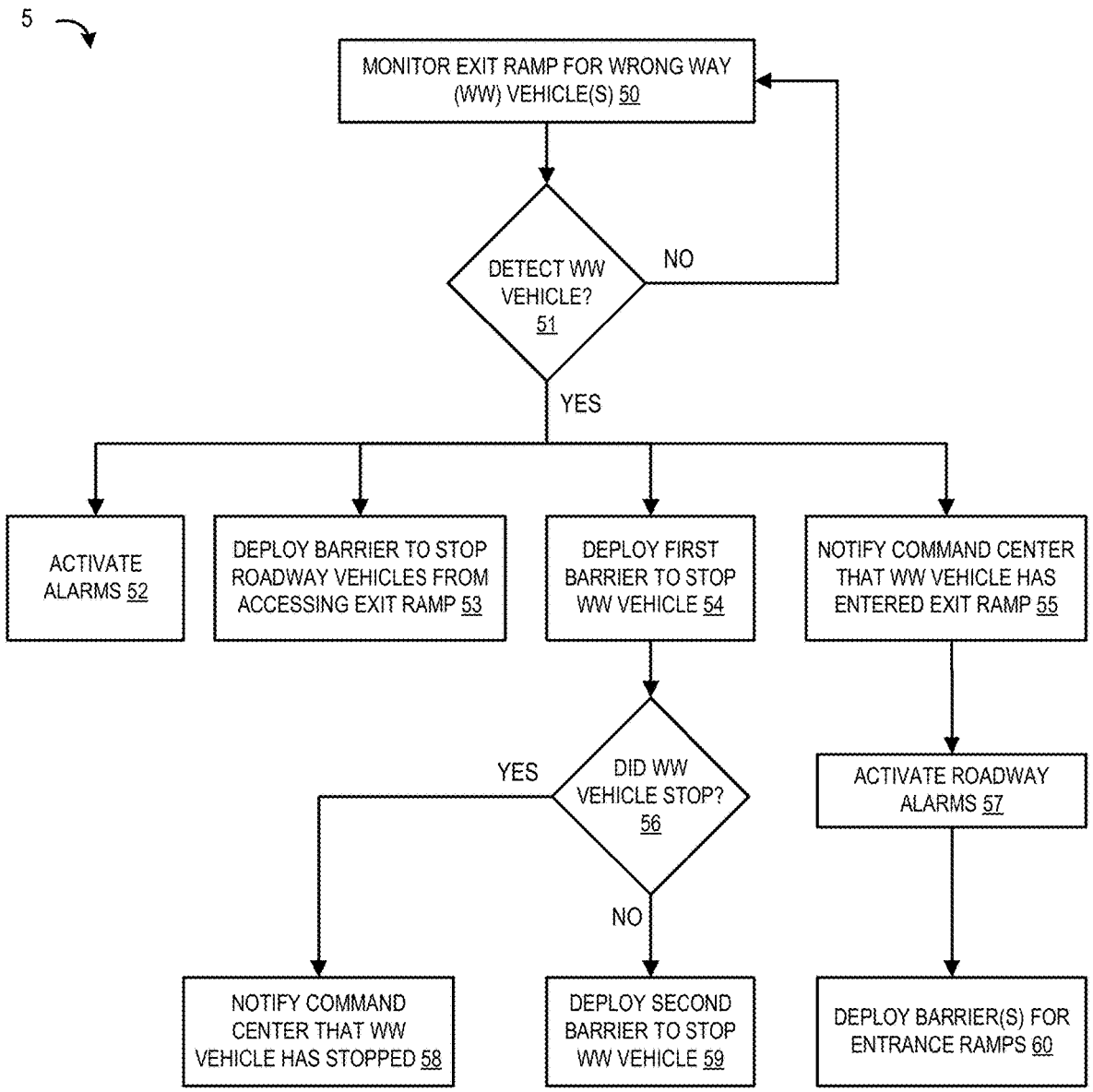
FIG. 5 illustrates a simplified flow chart showing the logic for operating a roadway safety system in accordance with a first selected embodiment of the present disclosure.

To provide additional details for an improved understanding of selected embodiments of the present disclosure, reference is now made to FIG. 5, which illustrates a simplified flow chart 5 showing the logic for operating a roadway safety system in accordance with a first selected embodiment of the present disclosure. The system continuously monitors 50 the exit ramp 14 for the presence of vehicles beginning to proceed onto the ramp 14 in the wrong direction. If the detection system 51 detects a wrong-way vehicle, it activates alarms 52 on the exit ramp, transmits a signal 55 to a central command center 40 with information captured from the vehicle, and deploys 54 a first barrier 26 on the exit ramp. The detection system 24 may also deploy 53 a barrier 34 to prevent vehicles on the roadway from exiting the roadway onto this exit ramp. The system 24 may also deploy 60 a second barrier (impenetrable) 32 past the first barrier 26 upon initially detecting a wrong-way vehicle 20 as a final way to stop the vehicle from entering onto the roadway in the wrong direction. Alternatively, the second barrier 32 could be activated 59 only after a second detector 56 sensed that the vehicle 20 did not stop at the first barrier 26. In response to detecting a wrong-way vehicle on an exit ramp, the central command center 40 could activate alarms 57 all along the roadway to alert drivers of an incident where a wrong-way vehicle was attempting to enter the roadway ahead of them. The central command center 40 could also deploy barriers 60 to block vehicles from entering the roadway from an entrance ramp. The command center 40 could also do a computerized search of records based on the information captured from the vehicle to locate a mobile phone number that it could call to warn the driver.

Figure 6:
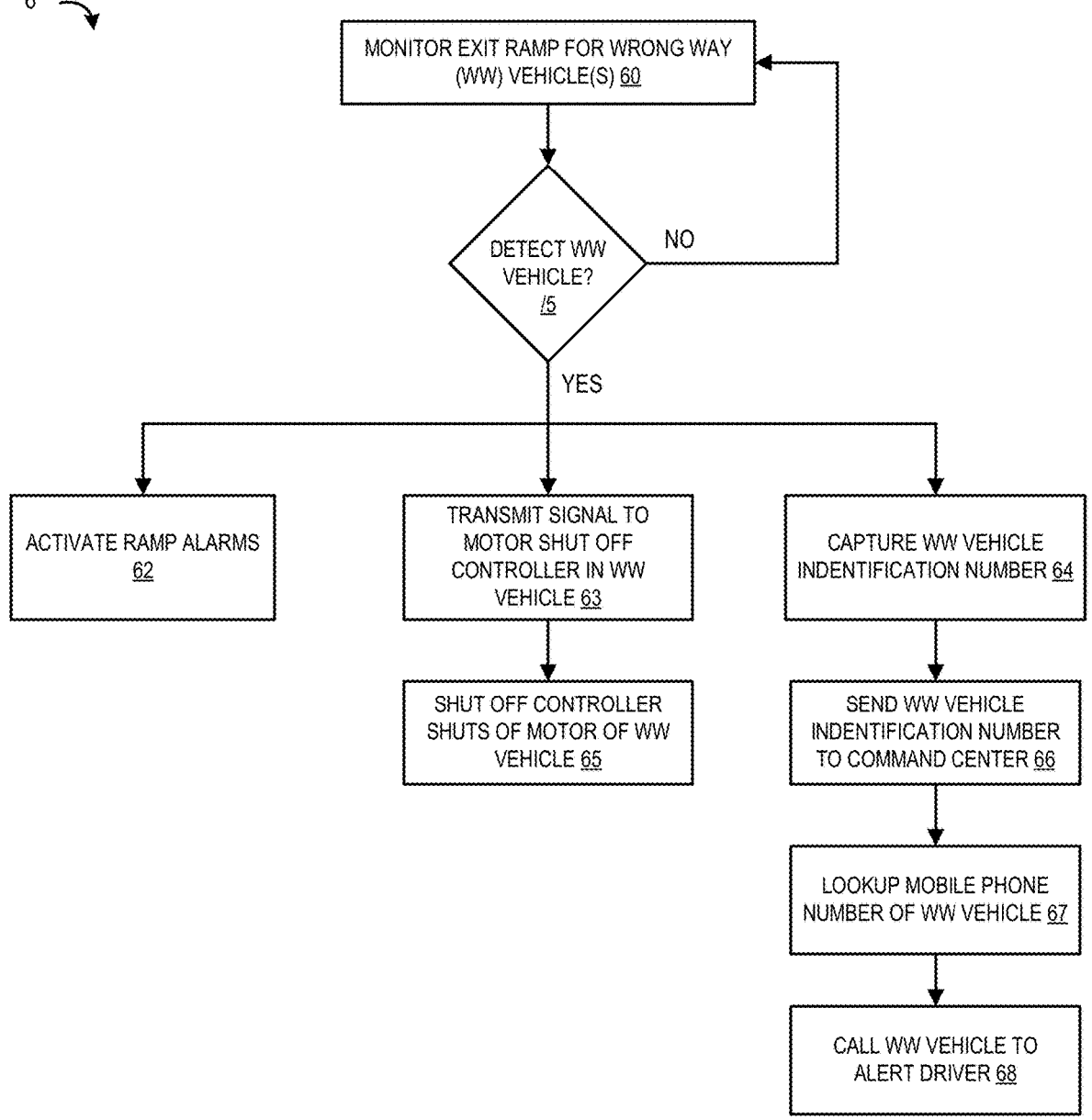
FIG. 6 illustrates a simplified flow chart showing the logic for operating a roadway safety system in accordance with a second selected embodiment of the present disclosure.

To provide additional details for an improved understanding of selected embodiments of the present disclosure, reference is now made to FIG. 6, which illustrates a simplified flow chart 6 showing the logic for operating a roadway safety system in accordance with a second selected embodiment of the present disclosure. The system monitors 60 the exit ramp 14 to detect the presence of a vehicle entering the exit ramp from the wrong direction. If in step 61 a wrong-way vehicle is detected, then it activates ramp alarms 62 and transmits a signal 63 to a motor shut off controller in the wrong-way vehicle and shuts of the motor of the wrong-way vehicle 65. In addition, the system could also capture 64 information about the wrong-way vehicle from a video surveillance system 21 that could also include detecting digital data from a tollway token or the like. The vehicle identification information could be sent 66 to a Command Center for the roadway. The Command Center could call the mobile phone number associated with the owner of the vehicle or tollway tag 67 in order to establish contact with the wrong-way driver and notify them that they are headed in the wrong direction on the roadway.

Figure 7:
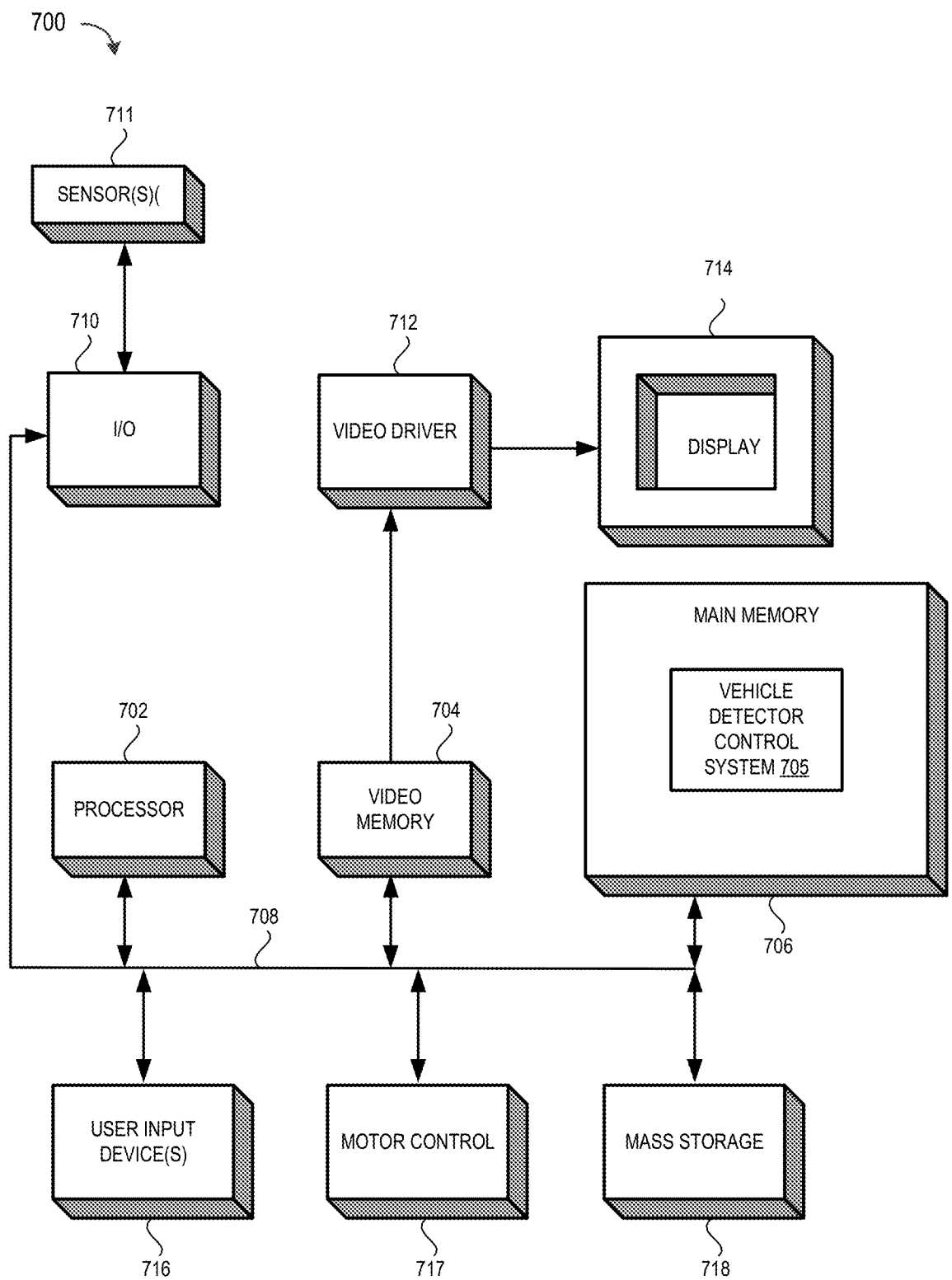
FIG. 7 is a simplified block diagram of a computer-based implementation of a vehicle detector control system in accordance with selected embodiments of the present disclosure.

To provide additional details for an improved understanding of selected embodiments of the present disclosure, reference is now made to FIG. 7, which depicts a simplified block diagram of a computer-based system 700 for implementing a vehicle detector control system 705. As disclosed, the computer 700 includes input user device(s) 716, such as a control panel, keyboard and/or mouse, which are coupled to a bi-directional system bus 708. The input user device(s) 716 are used for introducing user input to the computer system 700 and communicating that user input to processor 702. The computer system 700 may also include a video memory 704, main memory 706, I/O device(s) 710, motor control 717, and mass storage 718, all coupled to bi-directional system bus 708 along with input user device(s) 716 and processor 702. The mass storage 718 may include both fixed and removable media, such as other available mass storage technology. Bus 708 may contain, for example, 32 address lines for addressing video memory 704 or main memory 706. The system bus 708 may also include, for example, an n-bit data bus for transferring data between and among the components, such as CPU 502, main memory 706, video memory 714, and mass storage 718, where "n" is, for example, 32 or 64. Alternatively, multiplex data/address lines may be used instead of separate data and address lines.

The computer-based system 700 also includes one or more I/O device(s) 710 which provide connections to peripheral devices, including one or more sensors 711, such as magnetic sensors, electronic sensors, photoelectric sensors, cameras and physical sensors such as used by the vehicle detector 22. The I/O device(s) 710 may also provide a direct connection to remote server computer systems via a telephone link or to the Internet via an ISP, a wireless link, or the like. I/O device(s) 710 may also include a network interface device to provide a direct connection to remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in mass storage 718 until loaded into main memory 706 for execution. Computer programs may also be in the form of electronic signals modulated in accordance with the computer program and data communication technology when transferred via a network. The method and functions relating to system and method for providing a roadway safety system and/or vehicle detector control system 705. As will be appreciated, once the computer-based system 700 is configured to implement the vehicle detector control system 705, the computer-based system 700 becomes a specialized computing device specifically configured to implement the mechanisms of the illustrative embodiments and is not a general-purpose computing device. Moreover, as described hereafter, the implementation of the mechanisms of the illustrative embodiments improves the functionality of the computing device and provides a useful and concrete result that facilitates the road safety improvements by allowing dangerous vehicles to be detected and stopped before a head on collision can happen.

The processor 702, in one embodiment, is a microprocessor manufactured by Motorola Inc. of Illinois, Intel Corporation of California, Nvidia Corporation of California, or Advanced Micro Devices of California. However, any other suitable single or multiple microprocessors or microcomputers may be utilized. Main memory 706 is comprised of dynamic random access memory (DRAM). Video memory 704 is a dual-ported video random access memory. One port of the video memory 704 is coupled to video amplifier or driver 712. The video amplifier 712 is used to drive the display 714. Video amplifier 712 is well known in the art and may be implemented by any suitable means. This circuitry converts pixel data stored in video memory 704 to a raster signal suitable for use by display 714. Display 714 is a type of monitor suitable for displaying graphic images.

Under control of the processor(s) 702, the principal hardware elements of the road safety system include the sensor(s) 711 for detecting the presence and/or vehicle identification number of any wrong-way vehicle(s), the motor control 717 which controls the activation of the barriers and/or alarm systems in response to detecting wrong-way vehicles, and the vehicle detector control system 705 for monitoring the sensor(s) 711, notifying the command center of wrong-way vehicles, activating roadway alarms, transmitting motor shutoff signals to vehicles, capturing vehicle identification numbers, sending vehicle identification numbers to the command center, and/or contacting the wrong-way vehicle to alert the driver. For example, a first sensor 22 may be provided to detect that a vehicle has entered an exit ramp in the wrong direction, a second sensor 23 may be provided to detect that the vehicle has continued to drive down the exit ramp in the wrong direction, and these sensors may provide sensor data over the I/O device(s) 710 to the processor(s) 702 for storage and/or processing to detect that a vehicle is entering an exit ramp in the wrong direction as it drives onto the exit ramp, to transmit a signal to a control system that a vehicle is entering the exit ramp in the wrong direction, and to generate and send a signal to a motor controller 717 for deploying barriers and/or to shut off the motor of that vehicle.

By now, it should be appreciated that there has been provided an apparatus, method, program code, and roadway safety system for reducing accidents caused by vehicles entering an exit ramp from a roadway from the wrong direction. In the disclosed methodology, an exit ramp is monitored to detect a wrong-way vehicle that enters the exit ramp at an area where the exit ramp exits onto a street. In selected embodiments, the exit ramp monitoring includes monitoring a pair of sensors located at the area where the exit ramp exits onto the street to detect that any vehicle entering the exit ramp in a wrong direction. In other embodiments, the exit ramp monitoring includes monitoring one or more magnetic sensors located at the area where the exit ramp exits onto the street to detect a direction of any vehicle on the exit ramp. In other embodiments, the exit ramp monitoring includes monitoring a camera system focusing on the area where the exit ramp exits onto the street to detect a direction of any vehicle on the exit ramp. In other embodiments, the exit ramp monitoring includes monitoring a vehicle detector system located at the area where the exit ramp exits onto the street to detect a direction of any wrong-way vehicle on the exit ramp and to generate a signal to a control system, where the vehicle detector system comprises two generally parallel pedals that extend across a width of the exit ramp, where each of the parallel pedals are depressed by tires of any vehicle traveling over said pedal, and where the parallel pedals are spaced a distance apart greater than the contact patch of a vehicle tire. The disclosed methodology also includes transmitting a signal to a control system upon detecting the wrong-way vehicle that enters the exit ramp. In addition, the disclosed methodology includes generating and sending a signal to a motor controller on the wrong-way vehicle to shut off a motor of the wrong-way vehicle. The disclosed methodology may also include communicating a signal to a roadway central command system in response to detecting the wrong-way vehicle that enters the exit ramp, and then generating, by the roadway central command system, alarm signals along a roadway connected to the exit ramp from which vehicles exit onto the exit ramp, where the alarm signals alert drivers of vehicles exiting from the roadway onto the exit ramp that a vehicle has entered the exit ramp from a wrong direction. In addition or in the alternative, the disclosed methodology may also include communicating a signal to a roadway central command system in response to detecting the wrong-way vehicle that enters the exit ramp, and then generating, by the roadway central command system, an alarm signal along the exit ramp to alert a driver of the wrong-way vehicle that the wrong-way vehicle is attempting to enter the exit ramp in a wrong direction.

In another form, there is provided an apparatus, method, program code, and roadway safety system for reducing accidents caused by vehicles entering an exit ramp from a roadway from the wrong direction. In the disclosed methodology, an exit ramp is monitored to detect a vehicle that enters the exit ramp in a wrong direction. The disclosed methodology also includes detecting a wrong-way vehicle that enters the exit ramp in the wrong direction, and then transmitting a signal to a safety control system upon detecting the wrong-way vehicle to control deployment of a first barrier to stop the wrong-way vehicle. In addition, the disclosed methodology includes deploying the first barrier to stop the wrong-way vehicle from proceeding down the exit ramp in the wrong direction. In selected embodiments, the deployment of the first barrier includes deploying a barrier that is penetrable by the wrong-way vehicle. In other embodiments, the deployment of the first barrier includes deploying a barrier that is impenetrable by the wrong-way vehicle. The disclosed methodology may also include monitoring the exit ramp with a second detector to detect that the wrong-way vehicle did not stop at the first barrier, transmitting a signal to the safety control system in response to the second detector detecting that the vehicle did not stop at the first barrier, and deploying a second barrier across the exit ramp in response to the second detector detecting that the vehicle did not stop at the first barrier. In selected embodiments, the disclosed methodology may also deploy a second barrier between the first barrier and an entrance of the exit ramp to stop the wrong-way vehicle if it fails to stop at the first barrier. In addition, the disclosed methodology may include monitoring the exit ramp with a video surveillance system to capture an image of the wrong-way vehicle and a license plate on the wrong-way vehicle, and transmitting the image of the wrong-way vehicle and the license plate to a roadway central command system. In such embodiments, a mobile phone number of an owner of the wrong-way vehicle may be identified based on information captured by the video surveillance system, and then a call may be initiated to the mobile phone number to provide a warning that the wrong-way vehicle is headed the wrong-way. In other embodiments, the disclosed methodology may also include capturing vehicle identification data from the wrong-way vehicle, transmitting the vehicle identification data to a central command system, searching for a mobile phone number associated with the vehicle identification data wrong-way, and calling the mobile phone number associated with the vehicle identification data wrong-way to provide an alert that the wrong-way vehicle is traveling the wrong-way.

In yet another form, there is provided an apparatus, method, program code, and roadway safety system. The disclosed roadway safety system includes one or more sensors that monitor an exit ramp to detect the presence of a vehicle that enters the exit ramp in the wrong direction in the area where the ramp exits onto a street. In selected embodiments, the sensor(s) include a pair of sensors located at the area where the exit ramp exits onto the street to detect that any vehicle entering the exit ramp in a wrong direction. In other embodiments, the sensor(s) include one or more magnetic sensors located at the area where the exit ramp exits onto the street to detect a direction of any vehicle on the exit ramp. In other embodiments, the sensor(s) include a camera system focusing on the area where the exit ramp exits onto the street. In other embodiments, the sensor(s) include a vehicle detector system located at the area where the exit ramp exits onto the street to detect a direction of any wrong-way vehicle on the exit ramp, where the vehicle detector system comprises two generally parallel pedals that extend across a width of the exit ramp, where each of the parallel pedals are depressed by tires of any vehicle traveling over said pedal, and where the parallel pedals are spaced a distance apart greater than the contact patch of a vehicle tire. The disclosed roadway safety system also includes a vehicle detector control system connected to the one or more sensors to detect that a vehicle has entered an exit ramp in the wrong direction and to transmit a signal to a control system that a vehicle is entering the exit ramp in the wrong direction, where the vehicle detector control system is configured to generate and send a signal to a motor controller on the wrong-way vehicle to shut off a motor of the wrong-way vehicle.

While the invention has been described in connection with what is presently considered to be the most practical and preferred embodiment, it will be appreciated that other variations and alternatives to the disclosed examples are also contemplated, and the present invention is not necessarily limited to the example embodiments, which illustrate inventive aspects of the present invention that are applicable to various exercise equipment applications. Thus, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. The term "coupled," as used herein, is not intended to be limited to a direct coupling or a mechanical coupling. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
    monitoring an exit ramp to detect a vehicle that enters the exit ramp in a wrong direction,
    detecting a wrong-way vehicle that enters the exit ramp in the wrong direction,
    transmitting a signal to a safety control system upon detecting the wrong-way vehicle to control deployment of a first barrier to stop the wrong-way vehicle,
    deploying the first barrier to stop the wrong-way vehicle from proceeding down the exit ramp in the wrong direction, and
    deploying a second barrier between the first barrier and an entrance of the exit ramp to stop the wrong-way vehicle if the wrong-way vehicle fails to stop at the first barrier.

2. The method of claim 1, where deploying the first barrier comprises deploying a barrier that is penetrable by the wrong-way vehicle.

3. The method of claim 1, where deploying the first barrier comprises deploying a barrier that is impenetrable to the wrong-way vehicle.

4. The method of claim 1, where deploying the second barrier comprises:
monitoring the exit ramp with a second detector to detect that the wrong-way vehicle did not stop at the first barrier,
transmitting a signal to the safety control system in response to the second detector detecting that the vehicle did not stop at the first barrier, and
deploying the second barrier across the exit ramp in response to the second detector detecting that the vehicle did not stop at the first barrier.

5. The method of claim 1, further comprising:
monitoring the exit ramp with a video surveillance system to capture an image of the wrong-way vehicle and a license plate on the wrong-way vehicle, and
transmitting the image of the wrong-way vehicle and the license plate to a roadway central command system.

6. The method of claim 5, further comprising:
identifying a mobile phone number of an owner of the wrong-way vehicle based on information captured by the video surveillance system, and
initiating a call to the mobile phone number to provide a warning that the wrong-way vehicle is headed the wrong-way.

7. The method of claim 1, further comprising:
capturing vehicle identification data from the wrong-way vehicle,
transmitting the vehicle identification data to a central command system,
searching for a mobile phone number associated with the vehicle identification data wrong-way, and
calling the mobile phone number associated with the vehicle identification data wrong-way to provide an alert that the wrong-way vehicle is traveling the wrong-way.

8. A method comprising:
monitoring an exit ramp to detect a wrong-way vehicle that enters an exit ramp in a wrong direction with a vehicle detector system comprising two generally parallel pedals that extend across a width of the exit ramp, where each of the parallel pedals are depressed by tires of any vehicle traveling over said pedal, and where the parallel pedals are spaced a distance apart greater than a contact patch of a vehicle tire;
transmitting a signal to a safety control system upon detecting the wrong-way vehicle to control deployment of a first barrier to stop the wrong-way vehicle; and
deploying a first barrier to stop the wrong-way vehicle from proceeding down the exit ramp in the wrong direction.

9. The method of claim 8, where deploying the first barrier comprises deploying a barrier that is penetrable by the wrong-way vehicle.

10. The method of claim 8, where deploying the first barrier comprises deploying a barrier that is impenetrable to the wrong-way vehicle.

11. The method of claim 9, further comprising:
monitoring the exit ramp with a second detector to detect that the wrong-way vehicle did not stop at the first barrier;
transmitting a signal to the safety control system in response to the second detector detecting that the vehicle did not stop at the first barrier; and
deploying a second barrier across the exit ramp in response to the second detector detecting that the vehicle did not stop at the first barrier.

12. The method of claim 8, further comprising:
deploying a second barrier between the first barrier and an entrance of the exit ramp to stop the wrong-way vehicle if the wrong-way vehicle fails to stop at the first barrier.

13. The method of claim 8, further comprising:
monitoring the exit ramp with a video surveillance system to capture an image of the wrong-way vehicle and a license plate on the wrong-way vehicle; and
transmitting the image of the wrong-way vehicle and the license plate to a roadway central command system.

14. The method of claim 13, further comprising:
identifying a mobile phone number of an owner of the wrong-way vehicle based on information captured by the video surveillance system; and
initiating a call to the mobile phone number to provide a warning that the wrong-way vehicle is headed the wrong-way.

15. The method of claim 8, further comprising:
capturing vehicle identification data from the wrong-way vehicle;
transmitting the vehicle identification data to a central command system;
searching for a mobile phone number associated with the vehicle identification data wrong-way; and
calling the mobile phone number associated with the vehicle identification data wrong-way to provide an alert that the wrong-way vehicle is traveling the wrong-way.

16. A roadway safety system, comprising:
one or more sensors that monitor an exit ramp to detect a wrong-way vehicle that enters the exit ramp in the wrong direction in the area where the ramp exits onto a street,
a first barrier positioned on the ramp exit,
a second barrier positioned on the ramp exit, and
a vehicle detector control system connected to the one or more sensors to detect that a vehicle has entered an exit ramp in the wrong direction and to transmit a first signal to a safety control system upon detecting the wrong-way vehicle to control deployment of the first barrier to stop the wrong-way vehicle from proceeding down the exit ramp in the wrong direction, and to transmit a second signal to the safety control system to control deployment of the second barrier if the wrong-way vehicle fails to stop at the first barrier.

17. The roadway safety system of claim 16, where the one or more sensors comprise a pair of sensors located at the area where the exit ramp exits onto the street to detect that any vehicle entering the exit ramp in a wrong direction.

18. The roadway safety system of claim 16, where the first barrier comprises a first penetrable barrier that is positioned on the ramp exit to stop the wrong-way vehicle from traveling on the exit ramp in the wrong direction.

19. The roadway safety system of claim 18, where the second barrier comprises an impenetrable barrier that is positioned on the ramp exit to stop the wrong-way vehicle from traveling on the exit ramp in the wrong direction.

20. A method comprising:
monitoring an exit ramp to detect a vehicle that enters the exit ramp in a wrong direction,
detecting a wrong-way vehicle that enters the exit ramp in the wrong direction,
transmitting a signal to a safety control system upon detecting the wrong-way vehicle to control deployment of a first barrier to stop the wrong-way vehicle, deploying the first barrier to stop the wrong-way vehicle from proceeding down the exit ramp in the wrong direction, monitoring the exit ramp with a second detector to detect that the wrong-way vehicle did not stop at the first barrier, transmitting a signal to the safety control system in response to the second detector detecting that the vehicle did not stop at the first barrier, and deploying the second barrier across the exit ramp in response to the second detector detecting that the vehicle did not stop at the first barrier.

21. A method comprising:

monitoring an exit ramp to detect a vehicle that enters the exit ramp in a wrong direction, detecting a wrong-way vehicle that enters the exit ramp in the wrong direction, transmitting a signal to a safety control system upon detecting the wrong-way vehicle to control deployment of a first barrier to stop the wrong-way vehicle, deploying the first barrier to stop the wrong-way vehicle from proceeding down the exit ramp in the wrong direction, monitoring the exit ramp with a video surveillance system to capture an image of the wrong-way vehicle and a license plate on the wrong-way vehicle, transmitting the image of the wrong-way vehicle and the license plate to a roadway central command system, identifying a mobile phone number of an owner of the wrong-way vehicle based on information captured by the video surveillance system, and initiating a call to the mobile phone number to provide a warning that the wrong-way vehicle is headed the wrong-way.

22. A method comprising:

monitoring an exit ramp to detect a vehicle that enters the exit ramp in a wrong direction, detecting a wrong-way vehicle that enters the exit ramp in the wrong direction, transmitting a signal to a safety control system upon detecting the wrong-way vehicle to control deployment of a first barrier to stop the wrong-way vehicle, deploying the first barrier to stop the wrong-way vehicle from proceeding down the exit ramp in the wrong direction, capturing vehicle identification data from the wrong-way vehicle, transmitting the vehicle identification data to a central command system, searching for a mobile phone number associated with the vehicle identification data wrong-way, and calling the mobile phone number associated with the vehicle identification data wrong-way to provide an alert that the wrong-way vehicle is traveling the wrong-way.

* * * * *